United States Patent Office 3,836,588
Patented Sept. 17, 1974

3,836,588
METHOD OF PRODUCING CUMENE HYDROPEROXIDE
Cesare Reni, Busto Arsizio, Luigi Lugo, Milan, and Giorgio Gualdi, Verona, Italy, assignors to Societa Italiana Resine S.p.A., Milan, Italy
No Drawing. Filed Sept. 29, 1970, Ser. No. 76,588
Claims priority, application Italy, Oct. 1, 1969, 22,765/69
Int. Cl. C07c 73/08
U.S. Cl. 260—610 B         1 Claim

ABSTRACT OF THE DISCLOSURE

Cumene hydroperoxide is produced by the oxidation of cumene with molecular oxygen in the presence of the sodium salt of cumene hydroperoxide, this salt having been produced in solution and used directly as such.

---

The present invention relates to an improvement in the method of manufacturing cumene hydroperoxide by oxidation of cumene, in the liquid phase, using oxygen or a gas containing molecular oxygen.

The manufacture of cumene hydroperoxide by oxidation of cumene, long used in industrial technology, constitutes the first stage in a known process of synthesising phenol, which arises from oxidation of cumene, followed by acid hydrolysis of hydroperoxide to produce phenol and acetone, and finally the separation of the ketone and phenol compounds from one another and from the by-products of reaction.

Generally, cumene is oxidised in the liquid phase, in a homogeneous medium or in aqueous emulsion, by means of oxygen or gases containing molecular oxygen and generally under a few atmospheres' pressure.

For the rest, oxidation is usually conducted in the presence of small quantities of substances of a basic nature such as for example caustic soda, sodium carbonate and calcium carbonate.

The use of the sodium salt of cumene hydroperoxide has also been described, as an accelerating agent which, as compared with the aforesaid substances, has the advantage of permitting greater velocity and selectivity in the oxidation reaction of the cumene into the corresponding hydroperoxide.

Thus, according to the preceding technique, aqueous caustic soda and cumene hydroperoxide were brought into contact under special conditions, and the sodium salt of cumene hydroperoxide was separated by crystallisation and supplied to the reaction medium, normally in mixture with cumene.

Now it has been found that various advantages are achieved in the process of oxidation of the cumene into the corresponding hydroperoxide, by working in a liquid phase using oxygen or gases containing molecular oxygen, and in the presence of the accelerating agent constituted by the sodium salt of cumene hydroperoxide when this accelerating agent is fed into the reaction medium in the form of aqueous solution.

Thus, the method according to the present invention is substantially based on the direct supply of the cumene to the oxidation reactor, the aqueous solution obtained being in contact with aqueous caustic soda and concentrated cumene hydroperoxide, according to methods to be defined in greater detail hereinafter.

The rather good results which can be obtained by the known technique in the liquid phase oxidation of the cumene to form cumene hydroperoxide in the presence of the sodium salt of cumene hydroperoxide, were partly attributed to the fact of using a very pure form of activator as a result of the operations of crystallisation and separation of the sodium salt of cumene hydroperoxide.

It is therefore surprising that equally good and in some cases even better results can be obtained by feeding the aqueous solution just as it has been obtained from synthesis of the sodium salt of cumene hydroperoxide, to the reaction medium.

The method according to the persent invention also offers various advantages residing above all in the fact that the rather slow crystallisation of the sodium salt or cumene hydroperoxide is avoided, along with its separation from the products of reaction.

Furthermore, it is very convenient to feed an aqueous solution to the oxidation reactor, more convenient for example than feeding to it the sodium salt of cumene hydroperoxide in mixture with cumene.

In the practical embodiment of the method of the present invention, an aqueous solution of caustic soda and concentrated cumene hydroperoxide are supplied to an agitated container in which the temperature maintained is less than 60° C. and is preferably less than 40° C.

Indeed, it is known that at temperatures between 60° C. and 90° C., caustic soda decomposes the sodium salt of cumene hydroperoxide, as described for example by M. S. Kharasch, Journal of Organic Chemistry, 1952, *17*, 207.

Furthermore, it is not suitable to drop to temperatures below 0° C. and preferably below 10° C., if phenomena of crystallisation of the sodium salt of cumene hydroperoxide are to be avoided. Thus, in the preferred embodiment, the method will be carried out at ambient temperature levels.

Furthermore, in the formation of the sodium salt of cumene hydroperoxide, caustic soda is used in the form of an aqueous solution at a concentration of 10 to 20% by weight, whereas the cumene hydroperoxide will be at a concentration equal to or greater than 75% by weight.

In particular, in the manufacture of the sodium salt solution of cumene hydroperoxide, conditions are regulated so that a quantity of moles of cumene hydroperoxide equal to or greater than the moles of caustic soda will be supplied, in order to avoid the presence of caustic soda in the medium in which the cumene is supplied to the corresponding hydroperoxide. It has been found that optimum conditions are obtained by using stoichiometric quantities of reagents and by working with an excess of up to 2% by moles of cumene hydroperoxide as compared with caustic soda.

In the formation of the sodium salt of cumene hydroperoxide, contact times not in excess of about one hour are maintained, in order to avoid decomposition.

The bottom limit for the reagent contact time is not critical, and in any event depends on the conditions under which the reagents are brought into contact, such as for example the degree of agitation. Thus, when effective agitation is employed, it has been found that times of the order of a few minutes are adequate.

The aqueous solution of the activator thus prepared is supplied directly to the oxidation reactor together with the cumene and the oxidising gas.

More exactly, the conditions are regulated so as to supply from 0.05 to 0.5 parts by weight of the sodium salt of cumene hydroperoxide to every 100 parts by weight of cumene supplied. In the achievement of the objects of the present invention, the reaction of oxidation of the cumene to form the corresponding hydroperoxide is carried out at temperatures from 90 to 120° C. when supplying pure oxygen or gases containing molecular oxygen such as for example air or air enriched with oxygen.

It is possible to work at ambient pressure or preferably at a higher pressure such as for example at pressures of up to 6 atm. The method of the present invention may be carried out discontinuously but it is preferable to work continuously. In this case, the cumene, the aqueous solution of the activator and the oxidising gas are fed continuously to the oxidation reactor, from which the reaction mixture comprising unaltered cumene and cumene hydroperoxide, is discharged still continuously. In fact, in order to avoid excessive quantities of by-products, the cumene is converted only partially, generally in quantities not exceeding 30%.

The crude cumene hydroperoxide thus obtained may finally be converted into phenol or acetone by known processes. The following experimental examples will serve to illustrate the invention further without however confining its scope.

EXAMPLE 1

In a column made from AISI 304 steel with an inside diameter of 300 mm. and a height of 3,000 mm., equipped with a reflux cooler, automatic expansion valve on the coolant outlet and an automatic device for analysing the oxygen content of the used air, are placed 100 litres of cumene. 160 g./hr. of an aqueous solution of caustic soda of titre 11.2% by weight and 86 g./hr. of concentrated cumene hydroperoxide (titre 79.8% by weight) are added to a blender. In the blender, the solution is kept effectively agitated, the period of dwell of the reagents being equal to approx. 5 minutes.

250 g. of the resultant solution are fed to the column containing the cumene.

At this point, supply of the activator solution is discontinued and the contents of the column are heated to 95° C. by a reheating fluid circulating within a shell external of the column itself.

When the aforesaid temperature is reached, air is injected until an effective outlet pressure equal to 5 atm. is attained. Therefore, continuous conduction is initiated, cumene being fed to the column in quantities equal to 90 litres/hr., while aqueous caustic soda and concentrated cumene hydroperoxide are fed to the blender in quantities and by the method described hereinbefore. The solution discharged from the blender is fed directly to the column.

In particular, the supply of cumene, initiator solution and air is carried out at the bottom of the column, the injection of the liquid products being maintained at a level slightly higher than that of the air. During reaction, the injection of air is regulated so as to produce a 5 to 6% oxygen content in the exhausted gases.

By means of a level regulator, the oxidate is continuously discharged then washed in a little water and subsequently decanted into a continuous decanter.

By proceeding in this way, it is possible to obtain a solution of cumene hydroperoxide with a titre equal to 26.4% by weight. The cumene hydroperoxide thus obtained contains approx. 3.0% by weight of dimethyl phenyl carbinol and 0.9% by weight actophenone.

EXAMPLE 2

The same procedure is adopted as in Example 1, the temperature in the oxidation column being maintained at approx. 100° C., 200 g./hr. of aqueous caustic soda of titre 11.2% by weight and 110 g./hr. of concentrated cumene hydroperoxide (titre of cumene hydroperoxide 79.8% by weight) being fed continuously into the blender.

By proceeding under these conditions, a solution of cumene hydroperoxide is obtained which has a titre equal to 27.2% by weight. The cumene hydroperoxide thus obtained contains approx. 3.3% by weight of dimethyl phenyl carbinol and 1.5% by weight of acetophenone.

We claim:

1. In a process for producing cumene hydroperoxide consisting essentially of oxidizing cumene in liquid phase at a temperature of from 90 to 120° C. and at a pressure of from atmospheric to 6 atmospheres by continuously feeding, into a reaction zone, cumene, oxygen or a molecular oxygen-containing gas and the sodium salt of cumene hydroperoxide, and withdrawing from said reaction zone a product stream comprising unreacted cumene and product cumene hydroperoxide wherein the conversion of cumene to cumene hydroperoxide is only partial and does not exceed 30%, the improvement comprising feeding said sodium salt of cumene hydroperoxide to said reaction zone in the form of an aqueous solution thereof, the amount of said sodium salt of cumene hydroperoxide fed to said reaction zone being from 0.05 to 0.5% by weight, based on 100 parts by weight of cumene fed to said reaction zone, said aqueous solution of said sodium salt of cumene hydroperoxide being formed by a reaction between aqueous sodium hydoxide having a titre of from 10 to 20% by weight and at least a stoichiometric amount and not more than about 2 molar percent of an excess of concentrated cumene hydroperoxide having a titre of at least 75% by weight, said reaction being conducted with agitation for a period of time from a few minutes to one hour at a temperature of from 10 to 40° C.

References Cited

UNITED STATES PATENTS

| | | | |
|---|---|---|---|
| 3,171,860 | 3/1965 | Codignola | 260—610 B |
| 3,523,976 | 8/1970 | Reni et al. | 260—610 B |
| 3,523,977 | 8/1970 | Reni et al. | 260—610 B |

BERNARD HELFIN, Primary Examiner

W. B. LONE, Assistant Examiner